Patented Dec. 7, 1943

2,336,186

UNITED STATES PATENT OFFICE 2,336,186

PRODUCTION OF DEHYDRATED CASTOR OIL

Floyd G. Nessler, Rocky River, Ohio, assignor to The Sherwin-Williams Company, Cleveland, Ohio, a corporation of Ohio No Drawing. Application June 10, 1941, Serial No. 397,369

5 Claims. (Cl. 260—405.5)

This application is a continuation in part of application Serial No. 230,388 of Floyd G. Nessler and Erich Schuelke, filed September 17, 1938.

This invention relates to the production of a modified castor oil having desirable drying properties. More specifically, it involves the removal of the hydroxyl (OH) groups and hydrogen from adjacent carbon atoms, whereby said carbon atoms become connected by a double bond or linkage.

Castor oil is mainly a triglyceride of ricinoleic acid and smaller amounts of other acids, such as oleic acid, dihydroxy acids, etc. Ricinoleic acid triglyceride contains one hydroxyl group in each fatty acid chain. The position of the hydroxyl group is generally considered as being on the twelfth carbon atom of the chain of eighteen carbon atoms, counting from the carboxyl end. Each chain has a double linkage or bond, generally considered as being between the ninth and tenth carbon atoms.

Due to the presence of only one double bond in each chain, and the presence of a hydroxyl group on the chain, castor oil has little or no drying properties. By removing the hydroxyl group and the hydrogen atom from an adjacent carbon atom, and incorporating a second double adjacent carbon atom, and incorporating a second double bond between the carbon atoms from which the hydroxyl group and the hydrogen atom have been removed, the resulting modified castor oil has very decided drying properties, which adapts it for use in paints, varnishes and other liquid coating compositions, and for other purposes.

One of the main objects of the present invention is to remove all or substantially all of the hydroxyl groups, and in a simple manner, without the necessity for complicated or expensive processing, and by the use of inexpensive reactants. As a result, there is produced an oil of excellent color, which will dry rapidly to form a water- and alkali-resistant film, free from tackiness, and well adapted for coating compositions, and of the viscosity desired.

It is well known that under certain conditions castor oil may be esterified by causing an organic or inorganic acid or anhydride to unite with the carbon normally carrying the hydroxyl group with the elimination of water, and in many prior processes such esters have been considered as the final product.

The use of acetic acid to effect the dehydration of castor oil by first forming an ester and then heating to a higher temperature to break down the ester and drive off acid, is disclosed and claimed in the Brod Patent 2,212,385, issued August 20, 1940.

During the heating of the oil with the acid, the major portion of the acid reacts to form the ester, with the elimination of water formed from the hydroxyl group of the oil, but a portion of the acid unites with the glyceryl radical of the oil by replacing one or more of the ricinoleic acid radicals of the oil. There are thus formed, to a limited extent, mixed glycerides of the ricinoleic acid and the acid employed to effect the esterification.

Such acid radicals are not driven off during the decomposition of the ester, and the final product is thus not a pure glyceride of octadecadienoic acid, but is contaminated with mixed esters which impart objectionable characteristics to the product, particularly when used as a drying oil. The character and extent of such objectionable characteristics will of course vary with the character of the acid employed to effect the dehydration and ester formation, and to the extent of the substitution which takes place.

Due to the fact that acetic acid has no double bonds and has only two carbon atoms, as against eighteen in the acid radical of castor oil, a substitution of one acetic acid radical for one ricinoleic acid radical in a molecule of castor oil, very substantially reduces the molecular weight of the oil, and reduces by one-third the capacity of the molecules in which such substitution takes place, to form films by polymerizing with other molecules or by absorption of oxygen.

I have discovered that long chain unsaturated fatty acids may be employed to effect the dehydration and acylation or ester formation, and may be split off at a higher temperature, and removed by distillation, or left in the oil and esterified. By using such long chain unsaturated fatty acids, and preferably of a character closely analogous to octadecadienoic acid, the dehydration may be effected satisfactorily, and the final product does not have objectionable properties and may even have improved drying oil properties, depending upon the specific acid employed. If octadecadienoic acid be used, there will in theory be no substitution of acid in the glyceryl radical, and if there be any it is undetectable.

The same acid may be used in a cyclic system for treating all successive batches or portions of castor oil, as there is very little decomposition of the acid effected, and the acid comes out of the process in the same form as when it enters, except for added water which is readily removable.

Instead of using octadecadienoic acid I may use the acids of linseed oil or of fish oil, and for some purposes may use oleic acid or the acids of raw castor oil or of soya beans. Any acid having eighteen carbons in the chain may be employed, and any substitution which takes place will not affect, to any noticeable extent, the molecular weight of the final product, although the drying properties of the oil may be modified to some extent, depending upon the degree of unsaturation of the acid employed and the extent to which such acid becomes substituted for octadecadienoic acid in the oil. For instance, if oleic acid or the acids of soya bean oil be employed, the drying time of the final product is somewhat reduced, but its other properties are not changed to an objectionable extent. Preferably the long chain fatty acid used in my process has somewhere about the same number of carbon atoms in the chain as has the castor oil. Acids having a somewhat larger number of carbon atoms, such as the acids of fish oil or peanut oil, may be employed satisfactorily, or I may use acids having somewhat smaller numbers of carbon atoms, such as palmitic acid, palmitoleic acid, myristic acid, or the like. I may employ hydroxy acids such as ricinoleic acid.

The process may be carried out either in batch equipment or as a continuous process. Merely as an example of the use of the process in batch equipment, there may be employed a 500 gallon stainless steel kettle equipped with an agitator, and having condensers for the condensation of the distilled fatty acids. In such a kettle there may be added 1,200 pounds of raw castor oil having an acid value of 1.5, mixed with 1,100 pounds of dehydrated castor oil fatty acids having an acid value of 172. Such acids may be the ones distilled off from a previous process, and may contain a small amount of moisture together with some triglyceride, which accounts for the acid value somewhat lower than that of pure dehydrated castor oil fatty acids. The acid value of such a mixture as that above referred to would be between 80 and 90. It will be noted that the amount of acid used is far in excess of any amount of acid used as a mere catalyst.

The agitator is started and $CO_2$ is bubbled through the oil while heat is applied to the bottom of the kettle. The temperature is raised to 250° C. in about one hour, after which the $CO_2$ is turned off. During this period the esterification has been effected and the liberated moisture and practically all of the decomposition products, such as heptaldehyde and undecylenic acids have been distilled off. A vacuum is then slowly applied and the temperature is held at 250° C. for about an hour. The temperature is then raised to about 300° C. while gradually increasing the vacuum to about 27½ inches of mercury, and during a period of about an hour and a quarter. Steam is added when the temperature is about 270° C. to aid in distilling off the liberated acid. About ten minutes is taken to raise the temperature of from about 270° C. to about 310° C., where it is held for about fifteen minutes. The temperature is then dropped to about 295° C. and is held there until the desired viscosity is obtained, after which cold, dehydrated castor oil is added to the kettle to quickly drop the temperature of the oil in the kettle to about 210° C., and the product is pumped out of the kettle into storage. The final product will have an acid number of about 3 to 4.

In the initial heating to 250° C. it is preferable in some cases to use $CO_2$, but steam is cheaper than $CO_2$ and it, as well as nitrogen, natural gas, or any other inert gas may be employed.

The acid distilled off will contain some moisture resulting from steam condensation, and this may be readily removed by centrifuging or gravity separation, and the acid is ready for reuse with another batch.

A small amount of dehydrated castor oil acids may be added to the acid distilled off, to make up for losses due to the small amount of decomposition which has taken place. By separately collecting and condensing the steam and decomposition products produced during the esterification and the acid liberated during the breaking down of the ester, the collected acids distilled off will be substantially free of decomposition products.

The process may be carried out as a continuous one, as follows:

Three coffin type stills may be employed and connected in series, each having baffles so that the oil follows a circuitous path in traveling from one end of each still to the other. The stills may have separate heating units along the length thereof, so that the temperature of the oil may be varied in its passage through the still. Each still may have an ordinary surface condenser at the end for collecting the various distillates.

The mixture of long chain fatty acids and castor oil may be delivered continuously to the intake end of the first still at the rate of about 2,680 pounds per hour. No vacuum need be applied to the first still, but a small amount of steam or $CO_2$ is bubbled through the oil to maintain agitation thereof. The first portion of the first still may be heated to about 210° C., and the second section thereof to about 288° C. The water of dehydration and any decomposition products are distilled off from this unit of the continuous still. The esterified oil is continuously delivered to the second still, where a vacuum is maintained, and in the first section it may be heated to 296° C., and in the second and third sections to about 310° C. The oil flows from the second still to the third still, where the first section may be heated to about 305° C., and the second and third sections to about 270° C. The fatty acids are distilled off from this still as well as from the second still, and the dehydrated oil passes from the end of the third still in heat interchange relationship to the mixture of oil and acid delivered to the first still to cool the dehydrated oil and heat the supply mixture of raw oil and acid. When steam is employed to aid distillation, the fatty acids taken from the condensers of the second and third stills may be sent through a centrifuge to remove the major portion of the condensed steam. The acids may then be delivered to the mixing tank for use with a fresh batch of raw castor oil.

In the foregoing examples the ester resulting from the acid treatment of the oil is broken down at a higher temperature than that of esterification, and the acids are distilled off. Instead of distilling off the acids, they may be left in the dehydrated oil and sufficient polyhydric alcohol, such as glycerine, added to saponify the acids and thereby produce a further quantity of the dehydrated castor oil, if dehydrated castor oil acids were employed to effect the esterification. In carrying out the process in this way a fresh quantity of acid is needed for each batch, rather than recycling the same acid for successive batches or successive portions used in a continuous still.

I have mentioned castor oil in the above examples, but other hydroxy fatty acid glycerides may be employed.

The present process has many advantages over the use of such acids as acetic acid. The long chain fatty acids have a higher distillation temperature than acetic acid, and therefore higher temperature may be employed for the esterification, and the esterification speeded up with a reduction in the amount of decomposition or breaking in two of the long chains.

The product resulting from the use of long chain unsaturated acids instead of acetic acid, has improved weathering qualities and improved drying qualities, as the character of the acid radicals attached to the glyceryl radical has not been altered. The use of such long chain acids gives a product of good color and practically no odor, whereas products produced by the use of short chain acids may give as good a color, but are liable to have an objectionable odor.

The long chain fatty acids may be recycled without purification, whereas short chain acids become contaminated with long chain acids and decomposition products, which necessitates purification before reuse. The decomposition products are removed separately from the long chain acids during the process, due to the widely different boiling points, whereas the decomposition products may have substantially the same boiling point as short chain acids, and thus cannot be readily separated from the latter.

Having thus described my invention, what I claim as new and desire to secure by Letters Patent is:

1. The process of making a modified castor oil substantially free of hydroxyl groups and having two double bonds in the chain but substantially the same number of carbon atoms as castor oil, which includes heating the castor oil with a long chain mono-basic unsaturated aliphatic acid, said acid and the castor oil being in such molecular proportions that there are substantially as many acid molecules in the mixture as there are castor oil hydroxyl groups, to first form an ester of the acid and substantially all of the castor oil, and then heating to a higher temperature and under subatmospheric pressure to split off and remove substantially all of the acid.

2. The process of making a modified castor oil substantially free of hydroxyl groups and having two double bonds in the chain, which includes heating castor oil and octadecadienoic acid in such molecular proportions that there are substantially as many acid radicals in the mixture as there are castor oil hydroxyl groups, to form substantially all of the castor oil into an ester with the removal of water, and then heating to a higher temperature to split off and vaporize substantially all of the octadecadienoic acid.

3. The process of producing a fatty drying oil, which comprises esterifying alcoholic hydroxyl groups of castor oil with an unsaturated fatty acid having substantially the same number of carbon atoms in the chain as do the chains of the castor oil, heating the esterified oil to a temperature of about 300° C. under a vacuum while agitating by passing an inert gas therethrough to thereby split off the acid and volatilize it.

4. The process of producing a fatty drying oil from castor oil, which comprises acylating castor oil at the alcoholic hydroxyl groups with the mixed acids of dehydrated castor oil, heating the mixture to about 300° C. under vacuum, and while agitating with an inert gas to split off said acids and to remove them from the dehydrated fatty oil.

5. The process of producing dehydrated castor oil, which includes mixing castor oil and the mixed acids of dehydrated castor oil, passing the mixture through a continuous still having a first section heated to about 210° C. to effect esterification and removal of water of hydration, and a further section heated to about 310° C. to effect splitting off and removal of the acids, and returning the acids for mixture with a further quantity of castor oil to be passed through the still.

FLOYD G. NESSLER.